BROAD BAND AMPLIFIER DEVICES

Filed Oct. 24, 1952 2 Sheets-Sheet 1

C. T. GODDARD
N. C. WITTWER, JR
BY
James W. Falk
ATTORNEY

BROAD BAND AMPLIFIER DEVICES

Filed Oct. 24, 1952 2 Sheets-Sheet 2

C. T. GODDARD
N. C. WITTWER, JR
BY
ATTORNEY

United States Patent Office 2,747,138
Patented May 22, 1956

2,747,138

BROAD BAND AMPLIFIER DEVICES

Charles T. Goddard, Basking Ridge, and Norman C. Wittwer, Jr., Oldwick, N. J., assignors to Bell Telephone Laboratories, Incorporated, New York, N. Y., a corporation of New York Application October 24, 1952, Serial No. 316,744

16 Claims. (Cl. 315—58)

This invention relates to electron discharge devices and more particularly to broad band amplifiers.

As known in the art, the product of the gain and band width attainable with a space charge control electron discharge device is primarily a function of the transconductance and the total capacitances of the device and its associated circuitry. This product, which is usually called the gain-band figure of merit, may be expressed in several forms as determined by the method of circuit connection and the type of interconnecting network used between successive stages when the device is employed in multistage amplifier circuits. If, for example, the device is operated with its control grid at reference signal ground potential, the expression for the figure of merit assumes a particular form. Similarly, if the device is operated with its cathode at reference signal ground potential, the figure of merit assumes another form. For either of these types of operation when the device is incorporated into a multistage amplifier circuit the expression for the figure of merit is additionally dependent on the general form of the interstage network. Thus, the use of a two-terminal and a four-terminal interstage network will yield different expressions for the figure of merit.

It is known that a high product of gain and bandwidth is advantageously obtained by operation with the cathode at reference signal ground potential and with four-terminal impedance-transforming interstage networks. For this manner of operation the figure of merit may be expressed in the form:

$$F=K\frac{G_m}{\sqrt{C_{in}\,C_{out}}}$$

where $G_m$ is the transconductance of the device, $C_{in}$ is the total capacitance at the input of the device and includes both the input interelectrode capacitance and the stray capacitances associated with the input socket connections and leads and $C_{out}$ is the output capacitance and includes both the interelectrode output capacitance to the anode and the stray stem, socket and lead capacitances associated therewith. The constant "K" in the above expression is a function of the complexity of the four-terminal interstage network used, but is otherwise not generally subject to manipulation as a parameter in the design of electron discharge devices.

This invention is, of course, not to be considered as limited to the particular case for which this one figure of merit given above holds, but this particular figure of merit is to be utilized in the following discussion to illustrate the principles and aspects of this invention as it is particularly useful in showing the effect on the gain-band width product of the three parameters, the transconductance, the input capacitance and the output capacitance.

The band width over which a given amplification may be attained, i. e., the figure of merit of a device, may be increased, therefore, either by increasing $G_m$, the transconductance, or by decreasing the capacitances. It is known that the transconductance per unit area of the cathode may be increased by decreasing the input spacing, i. e., the spacing between the cathode and control electrode. While this also increases the input capacity $C_{in}$ it can be shown that the overall figure of merit is improved. This has been the method of the prior art. However, presently there are both mechanical restrictions, due to practical electrode wire size, etc., and electrical restrictions that impose upper limits on the improvements in the merit figures of amplifier devices that can be realized by decreasing the input spacing in present electron discharge devices. Thus, as transconductance and input capacitance are increased it becomes increasinly difficult to obtain stable performance at high frequencies and also difficult suitably to connect the external circuitry to the elements of the electron discharge device. As both the transconductance and the capacitance of an electron discharge device are proportional to the active areas of the device, that is, in one respect, to the area of the cathode, the figure of merit should be independent of cathode area and tube size. It has, therefore, been desirable to decrease the active area of the cathode and the other elements of the device to improve the stability of the device's performance at high frequencies and to enable external connections to be made more readily to the electrodes of the device while still retaining the desired figure of merit. However, such a procedure has priorly been undesirable since decreasing the transconductance and input capacitance of the device by decreasing the tube size causes the stray capacitances of the socket connections and leads to contribute more heavily to the capacitances of the device and particularly to the term $C_{out}$. Thus, the figure of merit does not remain independent of tube size, but is substantially degraded.

This may be demonstrated by considering the input and output capacitances, which may be defined by the equations:

$$C_{in}=C_1+C_{1s}$$
$$C_{out}=C_2+C_{2s}$$

where $C_1$ and $C_2$ are the input and output interelectrode capacitances, respectively, and $C_{1s}$ and $C_{2s}$ are the corresponding input and output stray capacitances. The figure of merit may then be rewritten in terms of $C_1$, $C_{1s}$, $C_2$, and $C_{2s}$ as follows:

$$F=K\frac{G_m\sqrt{C_1}}{C_1\sqrt{C_2}}\;\frac{1}{\sqrt{1+\frac{C_{1s}}{C_1}}}\;\frac{1}{\sqrt{1+\frac{C_{2s}}{C_2}}}$$

The first term in this expression represents an intrinsic figure of merit for the electrode structure of the device. The second and third terms are degradation factors which demonstrate the importance of stray capacitances.

The dilemma of the prior art is now clear. As described above, the figure of merit may be improved by decreasing the cathode-control electrode spacing. Both $G_m$ and $C_1$ per unit area are thereby increased. To obtain desirable high frequency stable performance, it is desirable to decrease the area of the active elements while keeping $C_1$ nearly constant. The input degradation factor may be changed very little by this procedure but the output capacitance $C_2$ is made smaller which causes an undesirable decrease in the output degradation factor and, therefore, a sharp decrease in the overall figure of merit of the device.

It is, therefore, a general object of this invention to increase the band width over which a given amplification is attainable, and thus to increase the figure of merit of electron discharge devices, and more specifically, it is an object of this invention to decrease the degradation introduced by stray capacitances in the output circuit. As it is usually found that the greater portion of the total input capacitance is interelectrode capacitance whereas the greater portion of the total output capacitance, as mentioned above, may be the stray capacitance due to leads, socket and wiring, it can be appreciated that a larger increase in the figure of merit can be attained by improvements in the output than by improvements in the input. This invention is not restricted to the output circuitry, however, since the methods are applicable to the input circuitry as well.

This invention is further not restricted to electron discharge devices operated with the cathode at reference signal ground potential, but is applicable also to other types of operation as will be obvious to those skilled in the art.

Thus, in accordance with one feature of this invention the actual interelement capacitances within the device are separated circuit-wise from the stray capacitances associated with the output connections and the effectiveness of the stray capacitances reduced. Thus, it is a feature of this invention that the total capacitance between the anode of an electron discharge device and ground be the interelement capacitance so that the only capacitance restricting the output bandwidth of the device is this interelement capacitance, there being no stray capacitances between the anode of the device and ground.

This is attained in accordance with our invention by employing an impedance transforming band pass filter network which may be capacitively coupled to the anode of the device and which is at least partially within the envelope of the device. The network advantageously comprises a first capacitance which is both utilized in the network and couples the network to the anode, series inductances, and shunt capacitances, the network being tapered so that the impedance across the network decreases from the anode. Thus, the network provides an impedance transformation between the high output impedance of the device and a low impedance circuit to which it may be connected. Advantageously when a plurality of such devices are employed in a multistage amplifier circuit, the network provides an impedance transformation between the high output impedance of one stage of the amplifier circuit and the low input impedance of the next stage and may advantageously comprise the interelectrode input capacitance of the electron discharge device of the next stage as one portion of the band pass filter network.

The impedance transforming band pass filter network described above is advantageously tapered by employing increasingly smaller series inductances and increasingly larger shunt capacitances. In accordance with a feature of the invention, the band pass filter network may extend through the envelope of the discharge device at any point along the network after which the shunt capacitance of the network is larger than the stray capacitances to ground. Thus in accordance with our invention, the impedance level at the node of the band pass filter network at which the output stray capacitances are added is low enough to accommodate that amount of impedance. In other words, enough of the band pass filter network is included within the envelope of the electron discharge device that the value of shunt capacitance in the network at the point of exit of the network from the envelope of the device be at least as great as the stray capacitances introduced by the socket and leads involved in exiting from the tube. Thus, in accordance with our invention the stray output capacitances are utilized as the shunt capacitance of the transformer band pass filter network at that point or as a portion of the shunt capacitance. Where this point will fall will depend upon the impedance transforming band pass filter network, the impedance levels of the device and the associated circuitry, and the stray capacitances.

In one specific embodiment of this invention, the entire tapered network is advantageously included within the envelope of the electron discharge device. In another specific illustrative embodiment, the filter network except for the first series capacitance between the network and the anode may advantageously be external to the envelope of the device, the anode comprising one plate of this series capacitance and the other plate of the series capacitance being external to the envelope and separated from the anode by the glass wall of the envelope. In this other specific illustrative embodiment, there is thus no lead connection extending through the envelope to portions of the network, whereby stray capacitances are considerably reduced so that the network may be brought outside the envelope of the device at a point in the network directly adjacent the anode itself.

With prior broad band amplifiers, and particularly in the design of amplifier networks including several stages comprising electron discharge devices and interconnecting interstage networks, the design of the circuit has proceeded from the imposed conditions of the discharge devices and particularly from the conditions imposed by their stray input and output capacitances. The circuit has then been designed with due regard to the limitations of the devices. By employing devices in accordance with our invention, it is possible to design the circuit first and then to match the impedance levels of the various devices to the circuit. In fact when employing devices in accordance with our invention it may be necessary for the circuit designer to add extra capacitance to ground; but he is not limited, as he was priorly, by the presence of stray capacitance to ground whether it was desired or not.

It is therefore a feature of this invention that the anode of an electron discharge device be coupled to an impedance transforming band pass filter network which is partially within the envelope of the device and more specifically be capacitively coupled thereto.

Further it is a feature of this invention that the portion of an impedance transforming filter network within the envelope of the electron discharge device be such that the value of shunt capacitance in the network at the point of exit be at least as great as the stray capacitances introduced by exiting from the device. In accordance with this feature of the invention, the stray capacitance to ground introduced by exiting from the device itself comprises one of the shunt capacitances of the filter network.

It is a stilll further feature of this invention that no direct connection be made to the anode through the envelope of the device, whereby the total capacitance between the anode and ground is the interelectrode capacitance within the device and there is no stray capacitance from the anode to ground. Thus, it is a feature of this invention that a direct current bias be applied to the anode by an internal resistor or other impedance element within the device.

Further it is a feature of one specific illustrative embodiment of this invention that the impedance transforming filter network be entirely within the envelope of the device and comprise a coil wound around a support rod and adjacent spaced annular disc extensions of the metallic envelope of the device, the disc extensions being of increasing width and defining with the coil the shunt capacitances of the network. In accordance with this feature of the invention, the coil is capacitively coupled to the anode.

Further it is a feature of another specific illustrative embodiment of this invention that the envelope of the device be of dielectric or vitreous material and that the anode be placed directly adjacent the envelope. A plate member is opposite the anode to the other side of the envelope therefrom, so that the first capacitance of the filter network is provided by the anode and this oppositely placed plate and no terminal leads extend through the envelope to couple the anode to the network. Further in accordance with this specific embodiment of this invention, the anode is advantageously cup-shaped to partially encompass the externally placed plate and shield it from external fields and further limit the stray output capacitances.

It is a still further feature of this invention that an amplifier circuit comprise a plurality of electron discharge devices interconnected by impedance transforming filter networks coupled to the anode of one device in accordance with this invention and comprising the input capacitance of the next device as the last section of the interstage filter network.

A complete understanding of this invention and of these and various other features thereof may be gained from consideration of the following detailed description and the accompanying drawing, in which.

Figure 1:
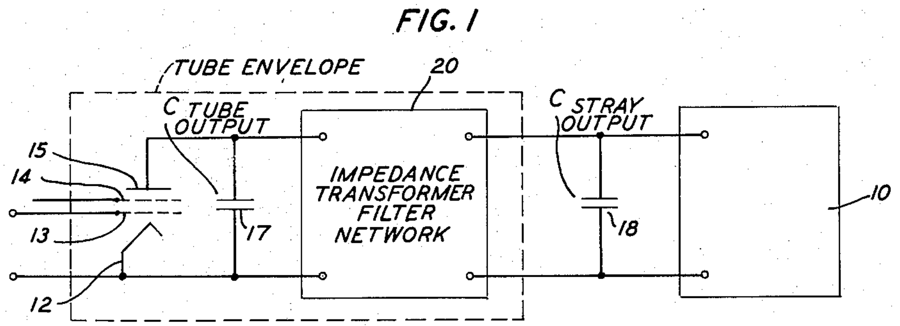
Fig. 1 is a greatly simplified schematic representation of the separation of the interelement and stray capacitance portions of the output capacitance of an electron discharge device in accordance with this invention.

As discussed above the problem presented by the prior art is the coupling of a broad-band amplifier discharge device to some external circuit or impedance 10 in such a manner that the gain-band width product is large and is not degenerated by the stray capacitances associated with the output leads. In other words, the problem of the prior art is to enable an electron discharge device to retain the high figure of merit it has due to its structure when it is placed in a circuit and subjected to the additional impedances incurred in placing it into the circuit. As shown the electron discharge device may have a cathode 12, control grid 13, a screen grid 14, and an anode 15. Ideally, the output capacitance which is included in the figure of merit and is partially determinative thereof need only be defined by the essential interelectrode capacitance 17 between the anode and the other elements of the device, which capacitance 17 may be referred to as $C_{\text{TUBE OUTPUT}}$. This is substantially the case when a device is not included in a circuit. As soon as that occurs there is another capacitance 18 between the anode and ground which is due to the socket, terminal and wire stray capacitances and may be referred to as $C_{\text{STRAY OUTPUT}}$. These two capacitances have priorly been determinative together of the figure of merit of the device and thus of its gain-band width product. In accordance with one aspect of this invention, however, these two portions of the output capacitance are separated by an impedance transforming band pass filter network 20 which includes as portions of the network the tube output capacitance 17 and the stray output capacitance 18. This network may be of any of several types, but advantageously includes at least a series capacitance coupling the network to the anode 15. At least a sufficient amount of the network 20 is within the envelope of the electron discharge device, indicated by the broken line 21, that the shunt capacitance across the network at the point of exit of the network through the envelope 21 is equal to or greater than the stray output capacitance 18 whereby the output capacitance may be absorbed by the network. The tube output capacitance 17 is small and may be of the order of 1.0 micromicrofarad. In the case where the network 20 exits from the envelope 21 of the device by means of a lead extending through the envelope 21, the stray output capacitance 18 due to the socket and wiring strays in a very carefully designed device may be of the order of 3.5 micromicrofarads. The impedance transforming band pass filter network 20 transforms the impedance of the output line so that when it exits from the tube the necessary shunt capacitance across the nework 20 is at least of the magnitude of the stray output capacitance. It should be pointed out that the numerical order of magnitude of the stray output capacitance 18 noted above does not hold for the embodiments of this invention wherein the output line of the device does not extend physically through the envelope of the device, as described further below with reference to Fig. 4.

While the impedance transforming band pass filter network 20 has only been shown within the envelope 21 of the device it is to be understood that in most applications it will be desirable to further transform the impedance of the output line so that actually portions of the network 20 will be both within and without the network, but in either vase the first section of the network within the device includes the tube output capacitance 17 across the network and the first stage of the network outside the device includes the stray output capacitance 18 across the network.

It may be pointed out that for the exemplary numerical values of tube output capacitance 17 and stray capacitance 18 noted above, the ratio of total output capacitance to that of the device itself is 4 to 1 so that the merit figure of the device in the circuit without the employment of this invention would be one-half that of the device itself.

Figure 2:
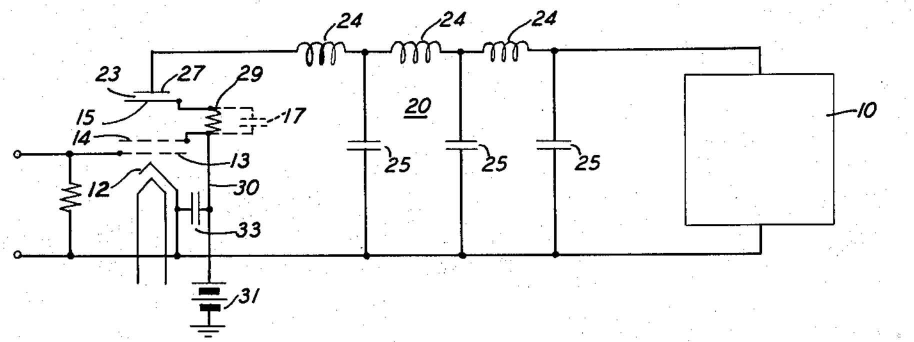
Fig. 2 is a schematic representation of one specific illustrative embodiment of this invention.

Turning now to Fig. 2 there is shown one specific illustrative embodiment of this invention wherein the impedance transforming band pass filter network 20 is advantageously a particular network that most readily lends itself to employment in accordance with this invention, though various other networks could be employed. Thus an impedance transforming band pass network having an initial shunt capacitance and a subsequent shunt capacitance and in which the initial shunt capacitance can be the interelectrode capacitance of the device and the subsequent capacitance in whole or part the stray output capacitances of the device could be employed. As seen in Fig. 2 the particular network 20 there depicted comprises a series capacitance 23, a plurality of series inductances 24, and shunt capacitances 25 and the initial shunt interelectrode capacitance 17 which is depicted as existing mainly between the anode 15 and screen grid 14 of the device. The network 20 is terminated by some load impedance or circuit 10. In accordance with this invention the series inductances 24 successively decrease in value while the shunt capacitances 25 successively increase in value and, as described above, the stray output capacitance 18 is included in or itself comprises one of the shunt capacitances 25, the envelope of the device including all of the network 20 to the anode side of that particular capacitance 25.

In accordance with another aspect of this invention the first capacitance 23 of the network 20 comprises the anode 15 and a plate 27 directly adjacent and capacitively coupled thereto. By directly capacitively coupling to the anode in this manner no lead connection is needed between the anode and the impedance transforming band pass filter network and consequently, no stray capacitances to ground are introduced due to such a lead. The capacitance 23 is not only included as an element of the network 20 and prevents stray capacitances to ground that might enter due to possible lead connections to the anode but also provides the direct current blocking element, isolating the anode 15, and thus the device itself, from the output network 20. Priorly blocking condensers have been included in output networks, such as interstage networks for multistage amplifiers, external to the envelope of the device and have been large to prevent deterioration of the transmission characteristics of the network; such large capacitors then have relatively large capacitances to ground. By capacitively coupling the network directly to the anode itself no stray capacitances are introduced by direct current blocking capacitors, and the stray capacitances, in accordance with this invention, may be effectively separated from the interelement capacitance to the anode.

In order to effectively separate the tube output capacitance from the stray output capacitance and to assure that the total capacitance between the anode and ground is in the interelectrode capacitance, it is desirable to apply the direct current bias to the anode without introducing any stray capacitances to ground thereby. Thus, in accordance with another aspect of this invention the direct current bias is applied to the anode 15 through a resistor 29 connected between the screen grid 14 and the anode 15, a positive bias being applied to the screen grid 14 by a lead 30 extending through the envelope of the device and connected to some external voltage source 31. A capacitor 33 having a very low impedance to signal currents is connected between the lead 30 and the cathode 12 and is in series with the interelectrode capacitance 17 so that the interelectrode or tube output capacitance 17 is thus connected between the anode 15 and ground and defines a first stage in the network 20.

Figure 3:
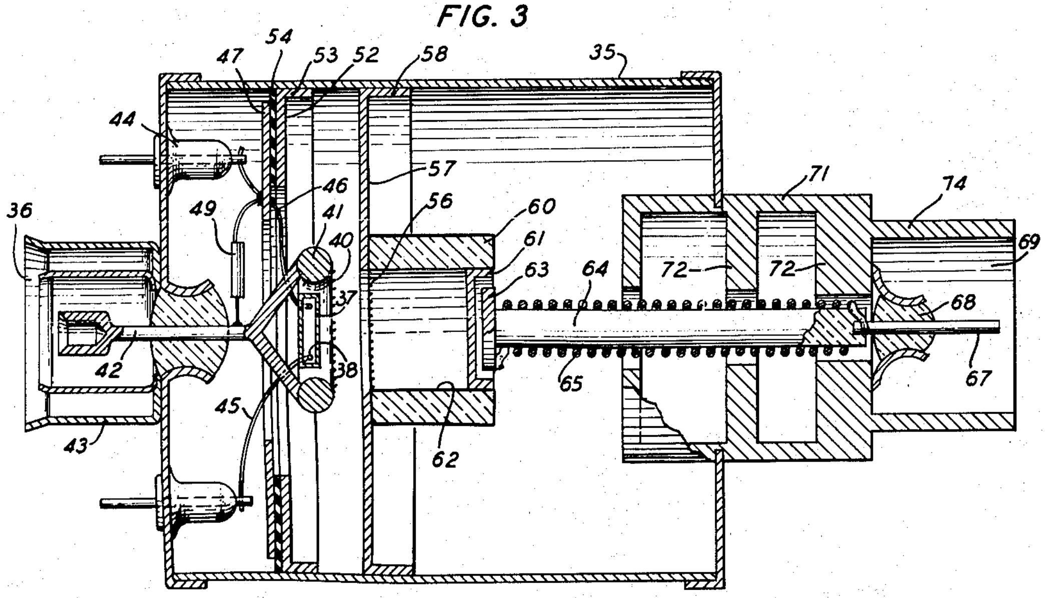
Fig. 3 is a cross-sectional view of one specific structural embodiment of this invention in accordance with Fig. 2.

One specific illustrative structural embodiment of this invention is shown in Fig. 3 and comprises a metallic envelope 35 having a coaxial input terminal 36 at one end. Positioned within the envelope 35 is a hollow rectangular cathode 37 having a heater element 38 therein, and a plurality of fine wires 40 directly adjacent the active surface of the cathode 27 and secured to a frame 41, the wires 40 defining the control electrode 13. The support of the cathode 27 and the wires 40 and the determination of the spacing therebetween may advantageously be as disclosed in Patent 2,663,819, issued December 22, 1953, to C. T. Goodard, the specific support structure not being disclosed in the drawing. The frame 40 is advantageously connected to the inner conductor 42 of the coaxial input terminal 36, the outer conductor 43 of which is connected to the envelope 35 of the device. A pair of eyelet terminals 44 are also situated in the base of the envelope 35 and a lead 45 extends from one terminal 44 to one side of the heater 38 and a lead 46 extends from the other terminal to an annular plate member 47, the other side of the heater 38, and to the cathode 37. A resistor 49 is also connected between the plate member 47 and the inner conductor 42 of the coaxial terminal, the resistor 49 forming a part of the termination of the interstage network. The plate member 47 together with a second annular plate member 52 advantageously having a side portion 53 brazed to the inner wall of envelope 35 and an annular mica disc 54 defines the by-pass capacitor 33 between the cathode 12 and the screen grid 14.

The screen grid 14 itself comprises a plurality of wires 56 across an annular frame member 57 advantageously having side portions 58 brazed to the inner wall of the envelope 35. The envelope 35 in this specific embodiment is thus advantageously at screen grid potential and has connected thereto the source 31 of positive voltage. A ceramic ring member 60 is supported by the screen grid frame 57 so that the screen grid wires 56 are across one end of the ring member 60. The other end of the ring member 60 is closed by a shallow cup-shaped anode 61. Advantageously in accordance with one aspect of this invention the surfaces of the ring member 60 have a resistive coating thereon, as of a deposited carbon coating 62, which defines the resistance 29 connected between the anode 15 and the screen grid 14 to apply the desired direct current bias to the anode. Thus no lead is directly brought from the anode cup 61 out through the envelope 35, and the anode bias is applied without the introduction into the tube of stray anode capacitances.

Positioned within the anode cup 61 but spaced therefrom is a disc member 63 corresponding to the plate 27 of Fig. 2 and defining with the anode 61 the coupling capacitance 23. The disc member 63 is supported at one end of a long ceramic rod 64 which has a coil of wire 65 wound around it, the coil defining the series inductances 24. The other end of the rod 64 advantageously has a terminal pin 67 extending into it. The pin 67 also extends through a terminal seal 68 and comprises the inner conductor of an output coaxial terminal 69.

A cylindrical block member 71 is positioned in and sealed to the output end of the envelope 35 and encompasses the rod 64 and coil 65. The block member 71 advantageously has a plurality of concentric disc portions 72 extending closely adjacent successive portions of to coil 65 and each defining therewith a capacitance 25. In accordance with one aspect of this invention these capacitances increase along the network 20 defined thereby and by the coil 65 away from the anode 61. Thus, advantageously the width of each successive disc portion 72 is larger than the preceding one. Similarly the inductances 24 defined by portions of the coil 65 successively decrease away from the anode 61. Each inductance 24 is defined by the portion of the coil between successive discs 72, and thus between successive capacitances 25; therefore, this decrease may readily be accomplished by spacing the discs 72 successively closer together. Alternatively the distance between discs may remain constant but the pitch of the coil 65 may vary increasingly. The end of the cylindrical block member 71 advantageously is a sleeve 74 defining the outer conductor of the output coaxial terminal 69.

Thus, in accordance with this specific embodiment of this invention the impedance transforming band pass filter network 20 comprises the interelectrode capacitance, the series capacitance between the anode 61 and plate 63, the series inductances defined by the sections of coil 65, the shunt capacitances between the coil 65 and the discs 72, and the stray output capacitance including the capacitance between the terminal 67 and the envelope 35.

Figure 4:
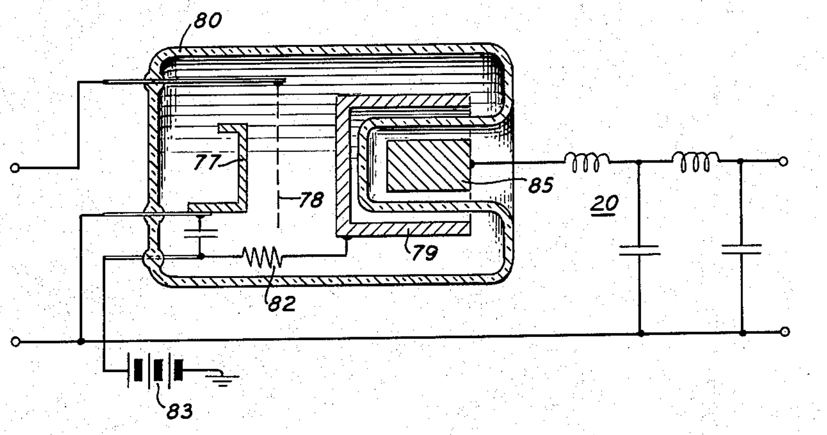
Fig. 4 is a schematic representation of another specific embodiment of this invention.

Turning now to Fig. 4 there is shown another specific illustrative embodiment of this invention comprising a triode electron discharge device having a cathode 77, control electrode 78, and anode 79 within a vitreous, such as glass, envelope 80. In accordance with this invention the tube output capacitance and the stray output capacitances are separated and no lead connections are made directly to the anode 79 through the envelope 80 whereby the total capacitance between the anode 79 and ground is the interelectrode capacitance within the envelope 80. Thus, the direct current bias is applied to the anode through a high resistance 82 within the envelope 80 and connected through the envelope to the external voltage source 83.

In this specific embodiment the anode 79 is cup-shaped and the portion of the envelope 80 directly adjacent thereto is similarly cup-shaped to extend within the anode. A plug 85 is positioned within the anode cup external to the envelope 80 and together with the anode 79 defines the anode to network coupling capacity 23. By positioning the plug 85, which is one plate of the capacity 23, within the anode 79, which is one plate of the capacity 23, stray capacitances existing between the plug 85 and ground are further considerably reduced. As no portion of the impedance transformation band pass filter network 20 physically extends through the envelope 80, the stray output capacitance, designated as 18 in Fig. 1, is greatly reduced, and the only portion of the network 20 that need be within the envelope 80 so that the shunt capacitance across the network is at least as large as the stray output capacitance at the point of exit of the network from the envelope 80 is the coupling capacitance 23.

Figure 5:
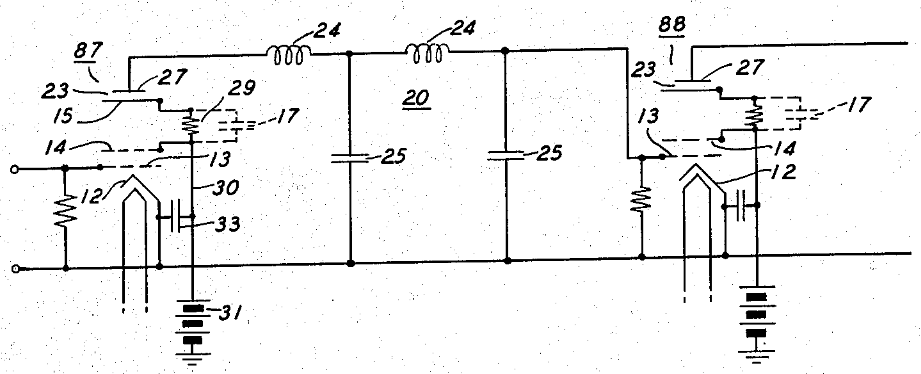
Fig. 5 is a schematic representation of a portion of a multistage amplifier circuit showing particularly the application of this invention to the elimination of the effects of both the stray input and output capacitances.

In Fig. 5 is shown another specific embodiment of this invention illustrative of a particular application of this invention and the employment of certain of the principles of this invention to eliminate the effect of the stray input capacitances on the figure of merit of the device as well. As shown, the impedance transformation band pass filter network 20 is the interstage network of a multistage amplifier and specifically interconnects two amplifier electron discharge devices 87 and 88, each advantageously in accordance with this invention. The first portion of the interstage impedance transformation network 20 comprises the series coupling capacitance 23 and the tube output capacitance 17. A subsequent portion of the network 20 includes as the shunt capacitance 25 or as a portion thereof the stray output capacitance 18, at which point along the network 20 the network exists through the envelope of the device 87. The last portion of the network 20 comprises the series inductance of the physical leads to the control grid 13 through the envelope of the device 88 and the interelectrode and stray input capacitances of the device 88, whereby the stray input capacitances are similarly employed in the network 20.

It is to be understood that the above-described arrangements are illustrative of the application of the principles of the invention. Numerous other arrangements may be devised by those skilled in the art without departing from the spirit and scope of the invention.

What is claimed is:

1. An electron discharge device with an increased figure of merit comprising an anode, a control grid, and a cathode positioned within the envelope of the device, and an impedance transforming band pass filter network connected to said anode and including a first shunt capacitance comprising only the anode interelectrode capacitance of the device, a distinct subsequent shunt capacitance comprising the stray output capacitance on exit of said network from the device and series filter elements within said envelope between said shunt capacitances, said network exiting from said envelope at a point where the shunt capacitance across the network is at least as great as the stray output capacitance.

2. Amplifying means in accordance with claim 1 wherein said network also comprises a series capacitance capacitively coupling said network to said anode.

3. An electron discharge device in accordance with claim 2 further comprising resistive means within said envelope connected to said anode and means for applying a direct current potential to said resistive means for biasing said anode, there being no direct physical connection through said envelope to said anode.

4. An electron discharge device comprising an envelope, a cathode, a control electrode, and an anode within said envelope, an impedance transformation filter network coupled to said anode and extending through said envelope, said network including as one element thereof within said envelope the anode interelectrode capacitance and, as a distinct other element thereof, the stray output capacitance associated with the exit of said network through said envelope, said network exiting through said envelope at a point such that the shunt capacitance across said network is at least as large as said stray capacitance, resistive means within said envelope and connected to said anode, and means for applying a direct current potential to said resistive means for biasing said anode.

5. An electron discharge device comprising an envelope, an anode within said envelope, a cathode opposite said anode and cooperating therewith, control grid means for introducing a signal to said envelope, means for applying a bias potential to said anode, said biasing means including a resistor within said envelope and connected to said anode and means for applying a bias to said resistor, and impedance transformation means for removing said signal from said envelope, said impedance transformation means comprising a filter network coupled to said anode, there being no direct physical connection from said anode through said envelope.

6. An electron discharge device in accordance with claim 5 wherein said network is within said envelope and comprises a coil having one end capacitively coupled to said anode and the other end extending through said envelope and capacitive means connected between said coil and ground at successive intervals along said coil.

7. An electron discharge device in accordance with claim 5 wherein said anode is adjacent said envelope and said impedance transformation means comprises a plate external to said envelope and directly adjacent said anode to capacitively couple said filter network to said anode, the remainder of said network being external to said envelope.

8. An electron discharge device comprising an envelope, an anode within said envelope, a cathode opposite said anode and cooperating therewith, control grid means for introducing a signal to said envelope, means for applying a biasing potential to said anode, said biasing means including a resistor connected to said anode and means for applying a bias to said resistor, and impedance transformation means for removing said signal from said anode, said impedance transformation means being at least partially within said envelope and comprising a filter network including a coil having one end coupled to said anode and the other end extending through said envelope at a point along said network such that the stray capacitances introduced between one portion of said network and ground on exiting from said envelope are less than the value of the shunt capacitance in said network at the point of exit of said network from said envelope.

9. An electron discharge device comprising a metallic envelope, a cathode, a control electrode, and a screen electrode supported within said envelope, said screen electrode being connected to said envelope, an anode within said envelope, resistive means connecting said envelope to said anode, a plate member in capacitive relationship to said anode, a coil extending within said envelope and having one end connected to said plate member and the other end extending insulatingly through said envelope, and annular members connected to said envelope and encompassing said coil at successive points along the length thereof to define shunt capacitances to said envelope.

10. An electron discharge device comprising a metallic envelope, a cathode, a control electrode, and a screen electrode within said envelope, means applying a direct current voltage to said anode including a resistance within said envelope and connected to said anode, a coil extending within said envelope, one end of said coil being coupled to said anode and the other end of said coil extending insulatingly through said envelope, and annular members connected to said envelope and encompassing said coil at successive points along the length thereof to define shunt capacitances to said envelope.

11. An electron discharge device comprising a metallic envelope, a cathode and a control grid positioned within said envelope, a screen grid support member connected to said envelope, a screen grid across said support member, an anode, a resistive member supporting said anode from said support member, a plate member in capacitive relationship to said anode, a rod-like member, a coil wound on said rod-like member and extending within said envelope, said coil having one end connected to said plate member, terminal means insulatingly extending through said envelope and connected to the other end of said coil, and a plurality of annular members connected to said envelope and encompassing successive portions of said coil along the length thereof to define shunt capacitances to said envelope.

12. An electron discharge device in accordance with claim 11 wherein the width of said annular members along said coil is successively larger from said plate capacitively coupled to said anode.

13. An electron discharge device comprising a metallic envelope, a cathode and a control grid closely spaced together and positioned within said envelope, means for applying an input signal between said cathode and said control grid, a screen grid frame secured to said envelope, a plurality of wires extending across said frame and defining a screen grid, a ceramic ring member positioned on said frame, said wires extending across one end of said ring member, an anode across the other end of said ring member, a resistive coating on said ring member and electrically connecting said anode to said screen grid frame, means applying a direct current voltage bias to said envelope, capacitance means connected to said envelope and between said envelope and said cathode, a ceramic rod member within said envelope, a plate secured to one end of said rod and positioned closely adjacent said anode to be in capacitive coupling relationship therewith, a coil wound on said rod, one end of said coil being connected to said plate, a cylindrical block member secured in said envelope and having a plurality of concentric disc members closely encompassing successive portions of said coil, the widths of said disc members increasing away from said plate end of said coil, and terminal means insulatingly extending through block member, the other end of said coil being electrically connected to said terminal means.

14. An electron discharge device comprising a vitreous envelope, a cathode, a control grid, and an anode within said envelope, said anode being cup-shaped and said envelope having a portion extending into said anode cup, a resistor within said envelope and electrically connected to said anode, means for applying a direct current bias to said resistor, a plug external to said envelope and extending into said anode cup, said plug being capacitively coupled to said anode, and impedance transformation filter network means connected to said anode by the capacitance defined by said anode and said plug for transforming the high impedance output of said device to a lower impedance for connection to other electrical apparatus.

15. Amplifying means comprising a first electron discharge device comprising an anode, a control grid, and a cathode within the envelope of the device, a second electron discharge device comprising an anode, a control grid and a cathode, and an impedance transformation filter network connecting said two devices, said network being coupled to the anode of said first device and comprising as one element thereof the capacitance between said anode and the other electrodes of said first device, as another element thereof the stray output capacitance of said first device, said network exiting through the envelope of said first device at a point at which the shunt capacitance of said network is at least as large as said stray output capacitances, and as a last element the input capacitance of said second discharge device.

16. Amplifying means comprising an electron discharge device having an anode, a control grid, and a cathode positioned within the envelope of the device, an energy transfer connection from said anode through said envelope, there being anode interelectrode capacitance within the device and stray capacitance associated with said connection, an impedance transforming band pass filter network coupled to said anode, said network including the anode interelectrode capacitance, series inductive elements within said envelope, and said stray capacitance, and exiting through said envelope by means of said connection so that the value of the capacitance of the first shunt capacitor across said network external to the envelope is at least as great as the value of said stray capacitance.

References Cited in the file of this patent

UNITED STATES PATENTS

| | | |
|---|---|---|
| 1,885,632 | Schelleng | Nov. 1, 1932 |
| 2,239,303 | Purington | Apr. 22, 1941 |
| 2,534,077 | Stevens | Dec. 12, 1950 |
| 2,554,877 | O'Neil et al. | May 29, 1951 |
| 2,628,328 | Scullin | Feb. 10, 1953 |
| 2,671,857 | Cage | Mar. 9, 1954 |